United States Patent [19]
Danylchuk et al.

[11] 3,813,661
[45] May 28, 1974

[54] SINGLE WALL DOMAIN LOGIC ARRANGEMENT

[75] Inventors: Irynej Danylchuk, Morris Plains; Joseph Edward Geusic, Berkeley Heights; Terence John Nelson, New Providence, all of N.J.

[73] Assignee: Bell Telephone Laboratories Incorporated, Murray Hill, N.J.

[22] Filed: May 29, 1973

[21] Appl. No.: 364,696

[52] U.S. Cl. 340/174 TF, 340/174 EB, 340/174 SR
[51] Int. Cl. .......... G11c 11/14
[58] Field of Search .......... 340/174 TF

[56] References Cited

UNITED STATES PATENTS

| | | | |
|---|---|---|---|
| 3,523,286 | 8/1970 | Bobeck et al. | 340/174 TF |
| 3,706,082 | 12/1972 | Bobeck et al. | 340/174 TF |
| 3,723,716 | 3/1973 | Bobeck et al. | 340/174 TF |

*Primary Examiner*—James W. Moffitt
*Attorney, Agent, or Firm*—W. L. Keefauver

[57] ABSTRACT

Single wall domain logic is achieved based on bubble-bubble interaction with good operating margins by expanding interacting domains to a known size as the interaction occurs.

5 Claims, 12 Drawing Figures

SINGLE WALL DOMAIN LOGIC ARRANGEMENT

FIELD OF THE INVENTION

This invention relates to magnetic logic arrangements, and more particularly to such arrangements in which information is represented as patterns of single wall domains and logic is performed by employing the interactions between such domains.

BACKGROUND OF THE INVENTION

The most practical arrangements employing single wall domains utilize a bias field to maintain domains at a nominal operating diameter and a pattern of magnetic elements responsive to a magnetic field reorienting in the plane of domain movement to move domains along paths defined by those patterns. Single wall domains so maintained are commonly called "bubbles" and the propagation arrangement for moving domains is called a "field access" arrangement. A. H. Bobeck, U.S. Pat. No. 3,534,347, issued Oct. 13, 1970, discloses the familiar field access, bubble arrangement employing a T and bar pattern of magnetic elements.

Bubble-bubble interaction to accomplish logic is disclosed in terms of a conductor access bubble arrangement in A. H. Bobeck, H. E. D. Scovil, and W. Schockley, U.S. Pat. No. 3,541,522, issued Nov. 17, 1970. A field access bubble arrangement in which such an interaction is employed for logic is disclosed in A. H. Bobeck, H. E. D. Scovil, U.S. Pat. No. 3,723,716, issued Mar. 27, 1973.

One problem which has occurred in the realization of practical logic circuits employing bubble-bubble interaction is that the size of the bubbles varies with bias field. As a result, when interaction occurs that variation can result in a limited operating range for the circuits. For example, margins in excess of 5–10 oersteds at a 100 kc in-plane field are difficult to realize because of such variations.

BRIEF DESCRIPTION OF THE INVENTION

The invention is based on the recognition that bubble logic circuits with relatively wide operating margins can be achieved if the bubbles can be maintained at a known geometry when interaction occurs, and that those margins are further enhanced if the domains are enlarged when interacted. To this end, a conductor is disposed to encompass two neighboring positions occupied by domains between which interaction is to occur. A pulse is impressed in the conductor of a value to drive domains in the two positions into strip out. The conductor defines a constraint for the limits of domain expansion as well as does the repulsion force between two domains. On the other hand, if only one domain is present, no interaction occurs and the sole domain ultimately occupies either one of the neighboring positions dictated by the orientation of the in-plane field when the expansion pulse terminates.

In one specific embodiment, a logic AND circuit is provided by T and bar-shaped magnetic elements for moving domains in adjacent channels. Neighboring positions in the two channels are encompassed by a conductor loop operative to strip out domains in the two positions. If two domains are present, each domain continues along its channel. If one domain is present, in either channel, a domain continues along only a pre specified one of the channels.

DETAILED DESCRIPTION

Figure 1:
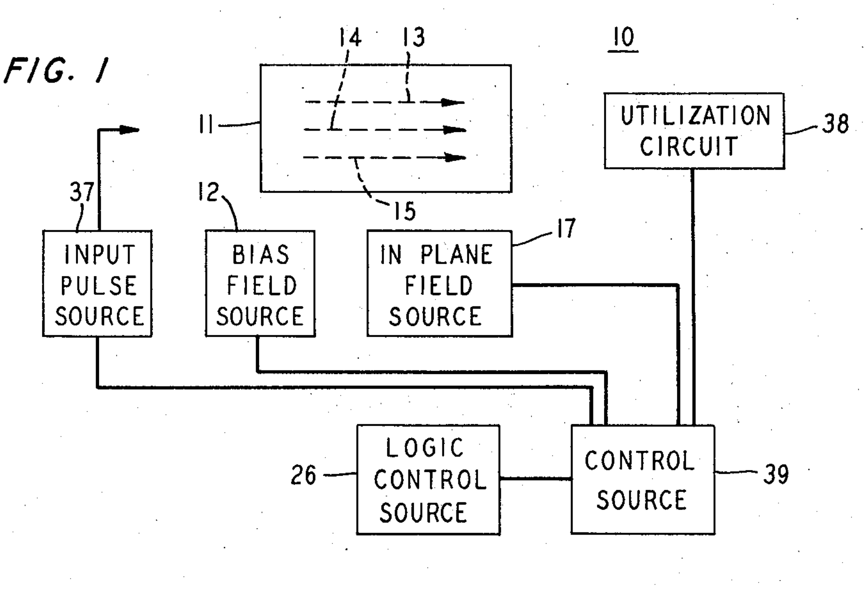
FIG. 1 is a schematic representation of a bubble logic arrangement in accordance with this invention.

FIG. 1 shows a magnetic bubble logic arrangement 10 in accordance with this invention. The arrangement comprises a layer 11 of material in which bubbles can be moved. Bubbles in layer 11 are maintained at a nominal operating value by a bias field supplied by a source represented by block 12 in FIG. 1.

Figure 2:
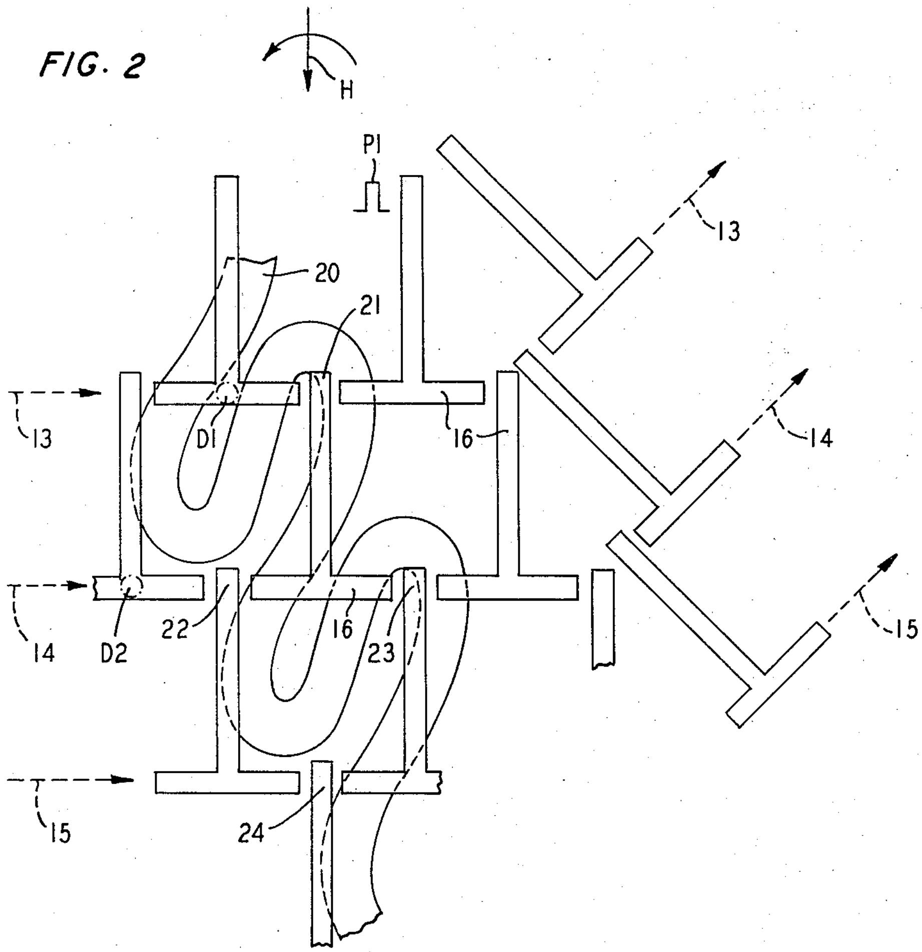
FIGS. 2–7 are schematic representations of portions of the arrangement of FIG. 1 showing the magnetic condition thereof during operation.

Bubbles are moved in layer 11 along channels indicated generally in FIG. 1 by broken arrows 13, 14, and 15. The channels are defined by magnetically soft elements 16, as shown in FIG. 2, which respond to a magnetic field reorienting in the plane of layer 11. The magnetic in-plane field source is represented in FIG. 1 by block 17 and indicated in FIG. 2 by the arrow H.

An electrical conductor 20 is shown interlinking associated positions 21 and 22 and 23 and 24 in FIG. 2. It will be shown that a domain moving to the right in channel 13 in FIG. 2 passes conductor 20 with its course unaltered or is moved to channel 14 depending on the presence or absence of a domain in the associated position of channel 14 when a logic operation occurs. The logic operation occurs in response to a pulse, $P_1$ of FIG. 2, applied to conductor 20 by a logic control source represented by block 26 in FIG. 1.

The movement of domains is observed in FIG. 2 at an instant when the in-plane is directed downward as indicated by arrow H in the figure. Domains $D_1$ and $D_2$ occupy corresponding positions in channels 13 and 14 for an inplane field in that direction. When the field next reorients to the right as indicated by arrow H in FIG. 3, domains $D_1$ and $D_2$ are moved toward positions 21 and 22.

Figure 4:
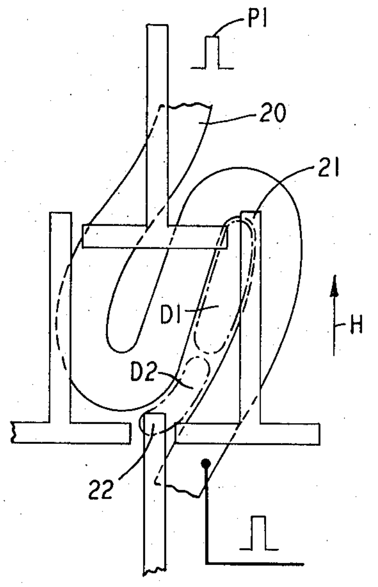

FIG. 4 shows the domain configuration when the in-plane field is directed upward. Pulse $P_1$ is applied to conductor 20 at this juncture in the operation. The pulse generates a field of a polarity to drive domains into strip out as indicated by the extended oval shapes which represent domains $D_1$ and $D_2$ in FIG. 4.

Pulse $P_1$ produces an "enlarging" field anti-parallel to the bias field and of sufficient strength to drive the domains into strip out. If two domains, $D_1$ and $D_2$, are present within the area encompassed by conductor 20, both expand within the constraint defined by the current path. The two domains also repel one another and do not coalesce for fields of up to 100 oersteds. The pulse $P_1$ terminates prior to the reorientation of the in-plane field to the left as indicated by arrow H in FIG. 5. Domain $D_1$ now continues to move to the right along channel 13 of FIG. 2 as the in-plane field continues to reorient. The presence of a domain in each of first and second positions encompassed by a conductor loop thus results in a domain moving along channel 13 at the termination of a "logic" pulse operative to enlarge those domains into a constraint for producing an interaction therebetween. The result is quite different when no domain is presen in channel 14 when logic pulse occurs.

Figure 3:
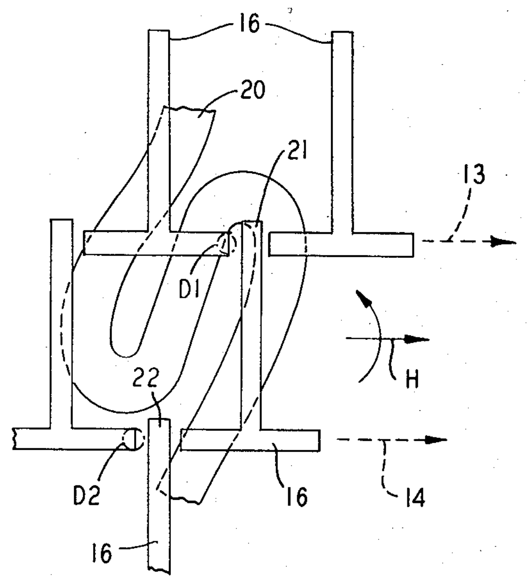
Figure 6:
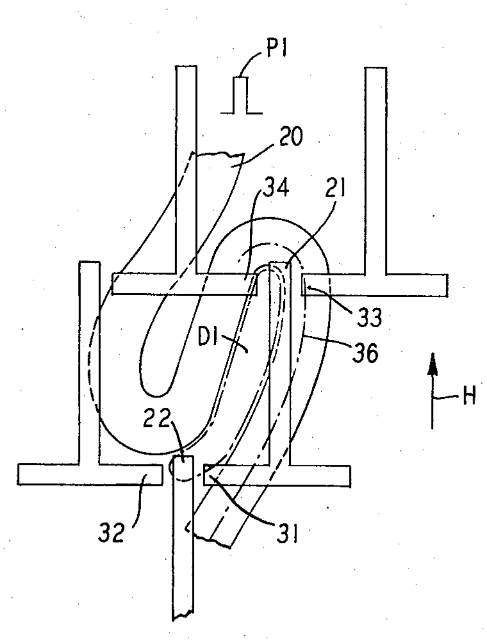
Figure 7:
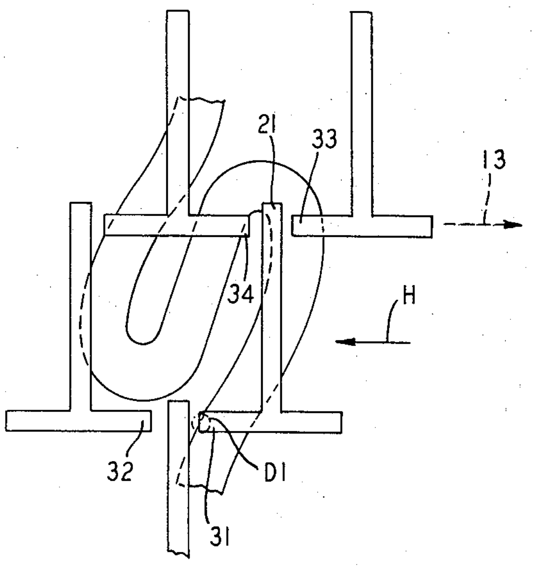

The operation in the presence of only a single domain when the logic pulse occurs is explained in connection with FIGS. 6 and 7. The initial condition may be taken as represented in FIG. 3 in the absence of domain $D_2$. FIG. 6 shows the in-plane field (arrow H) directed upward. Pulse $P_1$ is now applied to strip out domain $D_1$ into the area encompassed by conductor 20. In the absence of domain $D_2$, domain $D_1$ extends to position 22 in response to the pulse. When pulse $P_1$ terminates, domain $D_1$ contracts to occupy a position in channel 14 shown in FIG. 7 as the in-plane field reorients to the left as viewed. Note that domain transfer between channels occurs when only a single domain is present.

Figure 8:
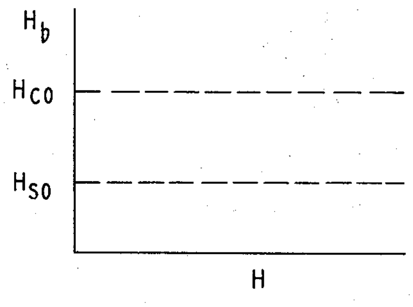
FIG. 8 is a graph showing bias field limits in materials for use in the arrangement of FIG. 1.

The logic pulse is of a level to drive domains into a strip out condition as has already been stated. A familiar plot of bias field $H_b$ versus drive field H shows the two values $H_{co}$ and $H_{so}$ of bias at which bubble collapse and bubble strip can occur, respectively. The logic pulse is selected to drive the area encompassing positions 21 and 22 to the $H_{so}$ value or below in the presence of the bias field supplied by source 12 of FIG. 1. (See FIG. 8.)

The logic pulse is applied at a time in the in-plane field cycle where the reorientation of the in-plane field at the termination of the logic pulse is determinative of the ultimate disposition of the domain or domains within the constraint defined by the conductor. For an orientation of the field to the left as viewed in FIG. 7, a field gradient consistent with repulsive poles at 32 to attractive poles at 31, is operative to move a domain to position 31. By the same token, a similar gradient occurs between positions 34 and 33 in FIG. 7. But as the in-plane field reorients to the left from the upward direction shown in FIG. 6, position 21 goes from an attracting to a (magnetically) neutral condition, position 34 goes from a neutral or a repelling condition, and the pulse in conductor 20 negates any attraction due to poles at 33. Consequently, the upward tip of domain $D_1$ in FIG. 6 is repelled downward.

Although a similar set of changes occur at the bottom and top tips of domain $D_1$, position 31 is not neutralized by the pulse in conductor 20. The reason for this lack of neutralization is that position 31 is to the left of the center line 36 of conductor 20 (as shown in FIG. 6) whereas position 33 is to the right. The right-hand rule shows that a field for expanding domains at position 31 contracts them at position 33. The constraint supplied by the pulsed conductor in the presence of the rotating inplane field thus can be seen to operate to provide within that constraint only a gradient at one tip of an expanded domain (i.e., the top tip) and an attracting field at the bottom. As a domain contracts it reduces its wall energy. Since the domain herein is firmly latched by the field at its bottom tip, it is unable to reach a similar attractive field at the top tip and the desired disposition of the domain results.

Figure 5:
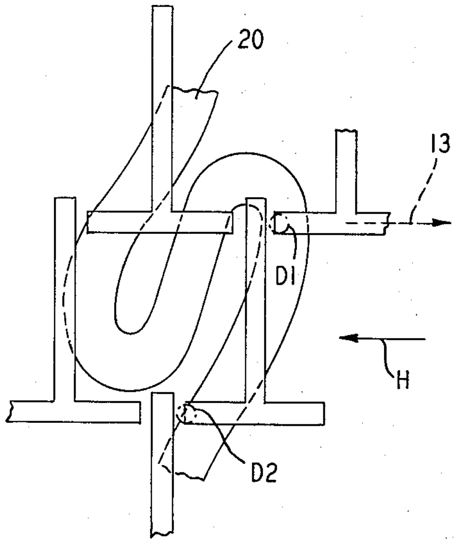

When two domains are present within the constraint, they repel one another sufficiently to overcome the repulsion from position 34 so that when the in-plane field reorients to the left, the disposition shwon in FIG. 5, for those domains occurs.

Block 37 of FIG. 1 represents an input pulse source for selectively entering a domain into the channels for logic operations as described. The domain in channel 13, representing an AND output, is advanced to a (viz: magnetoresistance) detection circuit (not shown) for applying an output signal to a utilization circuit represented by block 38 of FIG. 1.

Circuit 38, and sources 12, 17, 26, and 37 are synchronized and activated by a control circuit represented by block 39 of FIG. 1. The various circuits and sources may be any such elements capable of operating in accordance with this invention.

The pattern of elements shown in FIG. 2 specifically may be understood to selectively move a domain in a lower number channel to a next higher number channel or to avoid such "channel hopping" or transfer depending on the absence or presence, respectively, of a domain in that higher numbered channel in each instance. A domain in a lower numbered channel thus can be seen to hop to consecutively higher-numbered channels in the absence of other domains there. Consequently, the circuit shown is operative to lengthen the channel path of a domain controllably and to produce an output on a selected one of those higher numbered channels by entering a control domain in the next higher-numbered channel. This function is particularly attractive in the time slot interchange arrangements of the type disclosed in copending applications Ser. No. 214,269 filed Dec. 30, 1971 and 227,758 filed Feb. 22, 1972 for P. I. Bonyhard.

The angled orientation of the elements to the extreme right of each channel is to simplify the realization of the one stage timing difference for domains in different channels when those domains are gathered serially in an upward directed channel comprising the angled elements of all the channels in fulfillment of the requirements of time slot interchange functions.

Figure 9:
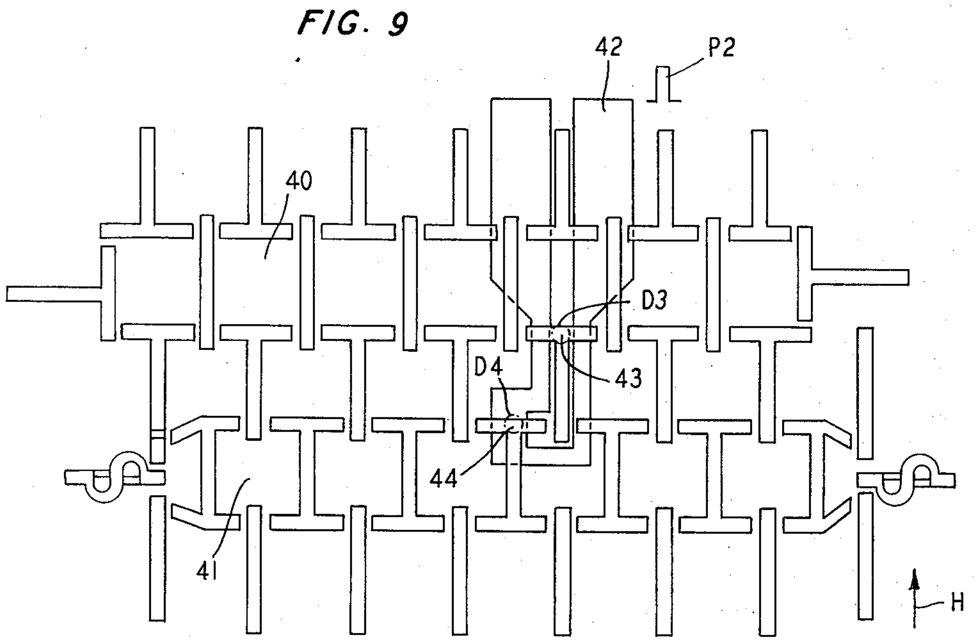
FIGS. 9–11 are schematic representations of portions of an alternative arrangement in accordance with this invention.

FIG. 9 shows a T and bar-shaped test pattern of magnetically soft elements where the effect of the in-plane field orientation is more clearly determinative of the ultimate disposition of a single domain when the logic pulse terminates. Two channels 40 and 41 are defined for recirculating domains $D_3$ and $D_4$ counterclockwise and clockwise, respectively, in response to a clockwise rotating (or pulsed) in-plane field. Conductor 42 is of a geometry to encompass positions 43 and 44 as shown.

Figure 10:
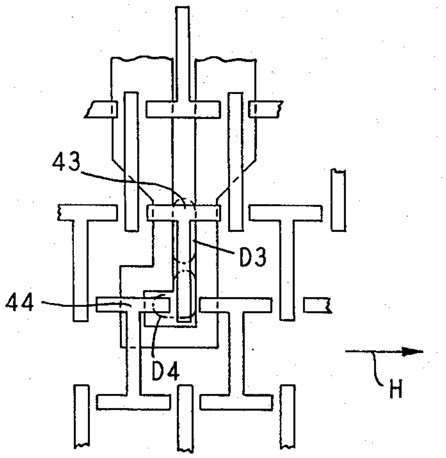
Figure 11:
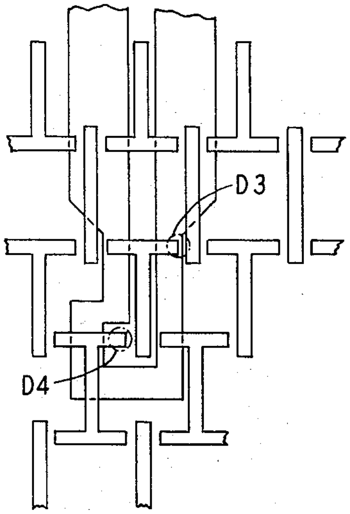

When the field is oriented upward as indicated by the arrow H in FIG. 9, domains $D_3$ and $D_4$ occupy positions 43 and 44 for the initiation of the logic operation. Pulse $P_2$ is applied to conductor 42 by a suitable pulse source such as 26 of FIG. 1 for initiating that operation. In response, domain $D_3$ strips out downward while domain $D_4$ strips out to the right and upward. The stripped-out domains are shown in FIG. 10. The logic pulse terminates at this juncture, resulting in the movement of the domains to the positions shown in FIG. 11, domain $D_3$ occupying the position shown due to repulsion from domain $D_4$.

If domain $D_4$ were absent, domain $D_3$ (in FIG. 10) would occupy the entire area encompassed by conductor 42. When the logic pulse is terminated in this situation, domain $D_3$ occupies the position shown for $D_4$ in FIG. 11.

From FIGS. 4, 6, and 10 it should be clear that domains are expanded within a constraint defined by the logic conductor. The center line of the conductor is the reference for a field reversal which follows the conductor. For the most part then, inasmuch as the geometry of the conductor is a closed loop, the constraint is well-defined by that field reversal. But in FIG. 4 at position 22 and again in FIG. 10 at 43 an opening in the conductor occurs. The constraint is completed at these points by a field gradient reduction defined by a sharply increased separation in the legs of conductor 20 at position 22 in FIG. 4 and by a sharply increased width of the legs of conductor 42 in FIG. 10.

A test circuit of the type shown in FIG. 9 comprised a layer 11 of $Y2.6Sm.4Ga_{1.2}Fe_{3.9}O_{12}$ having a thickness of 5.9$\mu$m with a saturation induction $4\pi M$ of 216 Gauss, and a material length $l$ of 0.64$\mu$m. The layer was grown on nonmagnetic $Gd_3Ga_5O_{12}$ by liquid phase epitaxial techniques. The permalloy pattern defining channels 40 and 41, formed on a separate substrate, comprised elements 4,000 Angstroms thick, 3.6$\mu$m wide and 21.6 long. Conductor 42 was of Au, 4,000 Angstroms thick and 8$\mu$m wide separated from the permalloy pattern by 6,500 Angstroms. The substrate bearing the permalloy and Au patterns was separated from layer 11 by 2$\mu$m. A bias field of 105 oersteds maintained the bubbles at a nominal diameter of 5.8$\mu$m. An in-plane field of 25 oersteds at a 100KC rate moved the bubbles in the circuit. A logic pulse having an amplitude of 30mA and a duration of 2.5$\mu$sec produced the AND operation described.

It is contemplated to build the circuit totally of permalloy where conductor 42 is defined in the mask from which the T-bar pattern is formed in order to achieve one-level processing.

Figure 12:
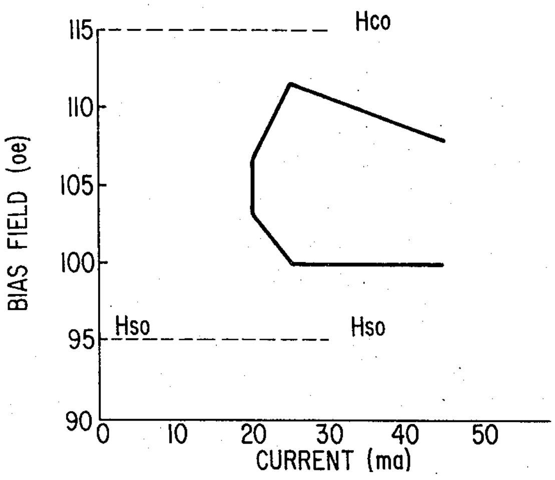
FIG. 12 is a graph showing the margins for the operation of the embodiment of FIGS. 9–11.

Margin data for the test circuit is summarized by a plot of logic pulse amplitude in milliamperes (abscissa) against bias field in oersteds as shown in FIG. 12. At low current, domain transfer did not occur and at low bias field values, domain strip out occurred instead of domain transfer. At high bias values and for increasingly higher logic current values the (AND) domain collapsed. But for a significant bias range and logic current range, very attractive margins were achieved.

What has been described is considered merely illustrative of the principles of this invention. Therefore, various modifications can be devised in accordance with those principles within the spirit and scope of the invention as encompassed by the following claims.

What is claimed is:

1. Magnetic apparatus comprising a layer of material in which single wall domains can be moved, means for selectively moving single wall domains into first and second positions in said layer, constraint means encompassing said first and second positions responsive to an external signal for driving domains into a strip out condition within said constraint means in a manner to utilize the repulsion force between first and second domains in said first and second positions to inhibit the movement of said first domain to said second position.

2. Magnetic apparatus in accordance with claim 1 wherein said means for moving comprises a pattern of elements coupled to said layer and defining therein first and second domain channels for moving domains to said first and second positions, respectively, in response to a magnetic field reorienting in the plane of said layer.

3. Magnetic apparatus in accordance with claim 2 wherein said constraint means comprises an electrical conductor.

4. Magnetic apparatus in accordance with claim 3 wherein said conductor is of a geometry and disposed with respect to said elements defining said first and second positions to provide, when pulsed, a field to attract said domain to said second position and tending to inhibit the attraction of said domain to said first position.

5. Magnetic apparatus comprising a layer of material in which single wall domains maintained between a collapse and a strip out value can be moved, means for defining in said layer first and second neighboring positions for first and second domains respectively, and means for selectively moving first and second domains into said first and second positions, characterized in that said apparatus comprises means responsive to an external signal for defining a constraint encompassing said first and second positions for generating a magnetic field operative to expand said domains there beyond said strip out value within said constraint in a manner to selectively permit said first domain to occupy said second position depending on the presence or absence of said second domain.

* * * * *